US012762089B2

(12) United States Patent
Ben Dayan et al.

(10) Patent No.: US 12,762,089 B2
(45) Date of Patent: *Oct. 13, 2026

(54) ACCESS REDIRECTION IN A DISTRIBUTIVE FILE SYSTEM

(71) Applicant: Weka.IO Ltd, Tel Aviv (IL)

(72) Inventors: Maor Ben Dayan, Tel Aviv (IL); Omri Palmon, Tel Aviv (IL); Liran Zvibel, Tel Aviv (IL)

(73) Assignee: WEKA.IO Ltd. (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/933,005

(22) Filed: Oct. 31, 2024

(65) Prior Publication Data

US 2025/0061087 A1 Feb. 20, 2025

Related U.S. Application Data

(63) Continuation of application No. 18/515,597, filed on Nov. 21, 2023, now Pat. No. 12,229,085, which is a (Continued)

(51) Int. Cl.

*G06F 16/13* (2019.01)
*G06F 16/17* (2019.01)
*G06F 16/182* (2019.01)

(52) U.S. Cl.

CPC ........ *G06F 16/134* (2019.01); *G06F 16/1727* (2019.01); *G06F 16/1734* (2019.01); *G06F 16/182* (2019.01)

(58) Field of Classification Search

CPC ............... G06F 16/134; G06F 16/1734; G06F 16/1727; G06F 16/182

(Continued)

(56) References Cited

U.S. PATENT DOCUMENTS 6,487,636 B1 11/2002 Dolphin et al.
7,447,839 B2 11/2008 Uppala (Continued)

OTHER PUBLICATIONS

Int'l Search Report and Written Opinion Appln No. PCT/IB2016/001177 mailed Dec. 2, 2016.

*Primary Examiner* — Phong H Nguyen
(74) *Attorney, Agent, or Firm* — McAndrews Held & Malloy, Ltd.

(57) ABSTRACT

A plurality of computing devices are communicatively coupled to each other via a network, and each of the plurality of computing devices is operably coupled to one or more of a plurality of storage devices. A plurality of failure resilient address spaces are distributed across the plurality of storage devices such that each of the plurality of failure resilient address spaces spans a plurality of the storage devices. The plurality of computing devices maintains metadata that maps each failure resilient address space to one of the plurality of computing devices. The metadata is grouped into buckets. Each bucket is stored in the backend of a computing device. Access to a storage device may be managed according to an availability of the storage device. Reads from and writes to a storage device may be redirected when, for example, the storage device is over-utilized or performing garbage collection.

23 Claims, 6 Drawing Sheets

Related U.S. Application Data continuation of application No. 17/402,813, filed on Aug. 16, 2021, now Pat. No. 11,899,621, which is a continuation of application No. 16/273,767, filed on Feb. 12, 2019, now Pat. No. 11,093,444.

(60) Provisional application No. 62/692,905, filed on Jul. 2, 2018.

(58) Field of Classification Search
USPC .................................. 707/626, 770, 781, 782
See application file for complete search history.

(56) References Cited

U.S. PATENT DOCUMENTS

| | | | | |
|---|---|---|---|---|
| 7,587,630 | B1 * | 9/2009 | Cassell | G06F 11/1088 714/47.3 |
| 7,681,072 | B1 | 3/2010 | Gibson et al. | |
| 7,793,146 | B1 | 9/2010 | Gibson et al. | |
| 8,645,749 | B2 | 2/2014 | Reche | |
| 8,918,478 | B2 | 12/2014 | Ozzie et al. | |
| 9,087,012 | B1 | 7/2015 | Hayes et al. | |
| 9,448,887 | B1 | 9/2016 | Ben Dayan et al. | |
| 9,860,317 | B1 | 1/2018 | Gupta | |
| 9,990,263 | B1 * | 6/2018 | Tian | G06F 11/1092 |
| 11,093,444 | B2 | 8/2021 | Ben Dayan et al. | |
| 2003/0002503 | A1 * | 1/2003 | Brewer | H04L 47/122 370/410 |
| 2006/0112222 | A1 | 5/2006 | Barrall | |
| 2010/0199125 | A1 | 8/2010 | Reche | |
| 2015/0046668 | A1 * | 2/2015 | Hyde, II | G06F 12/00 711/162 |
| 2015/0205668 | A1 | 7/2015 | Sundaram et al. | |
| 2015/0269025 | A1 * | 9/2015 | Krishnamurthy | G06F 11/1092 714/6.24 |
| 2015/0355971 | A1 | 12/2015 | Becker-Szendy et al. | |
| 2016/0124847 | A1 | 5/2016 | Malwankar et al. | |
| 2016/0246677 | A1 | 8/2016 | Sangamkar et al. | |
| 2017/0052847 | A1 * | 2/2017 | Ben Dayan | G06F 11/1088 |
| 2017/0123700 | A1 * | 5/2017 | Sinha | G06F 3/065 |
| 2019/0095296 | A1 * | 3/2019 | McMurchie | G06F 11/1076 |
| 2019/0129863 | A1 * | 5/2019 | Jibbe | G06F 12/0871 |
| 2019/0181887 | A1 * | 6/2019 | Banerjee | G06F 3/064 |

* cited by examiner

ACCESS REDIRECTION IN A DISTRIBUTIVE FILE SYSTEM

This present application is a continuation of U.S. application Ser. No. 18/515,597 filed Nov. 21, 2023, which is a continuation of U.S. application Ser. No. 17/402,813 filed Aug. 16, 2021, which is a continuation of U.S. application Ser. No. 16/273,767 filed Feb. 12, 2019 (U.S. Pat. No. 11,093,444), which claims priority to U.S. provisional patent application 62/692,905 filed on Jul. 2, 2018, now expired. Each of the above-referenced applications is hereby incorporated herein by reference in its entirety.

BACKGROUND

Limitations and disadvantages of conventional approaches to data storage will become apparent to one of skill in the art, through comparison of such approaches with some aspects of the present method and system set forth in the remainder of this disclosure with reference to the drawings.

INCORPORATION BY REFERENCE

U.S. patent application Ser. No. 15/243,519 titled "Distributed Erasure Coded Virtual File System" is hereby incorporated herein by reference in its entirety.

BRIEF SUMMARY

Methods and systems are provided for access redirection in a distributed file system substantially as illustrated by and/or described in connection with at least one of the figures, as set forth more completely in the claims.

DETAILED DESCRIPTION

Traditionally, file systems use a centralized control over the metadata structure (e.g., directories, files, attributes, file contents). If a local file system is accessible from a single server and that server fails, the file system's data may be lost if as there is no further protection. To add protection, some file systems (e.g., as provided by NetApp) have used one or more pairs of controllers in an active-passive manner to replicate the metadata across two or more computers. Other solutions have used multiple metadata servers in a clustered way (e.g., as provided by IBM GPFS, Dell EMC Isilon, Lustre, etc.). However, because the number of metadata servers in a traditional clustered system is limited to small numbers, such systems are unable to scale.

The systems in this disclosure are applicable to small clusters and can also scale to many, many thousands of nodes. An example embodiment is discussed regarding non-volatile memory (NVM), for example, flash memory that comes in the form of a solid-state drive (SSD). The NVM may be divided into 4 kB blocks and 128 MB chunks. Extents may be stored in volatile memory, e.g., RAM for fast access, backed up by NVM storage as well. An extent may store pointers for blocks, e.g., 256 pointers to 1 MB of data stored in blocks. In other embodiments, larger or smaller memory divisions may also be used. Metadata functionality in this disclosure may be effectively spread across many servers. For example, in cases of "hot spots" where a large load is targeted at a specific portion of the file system's namespace, this load can be distributed across a plurality of nodes.

Figure 1:
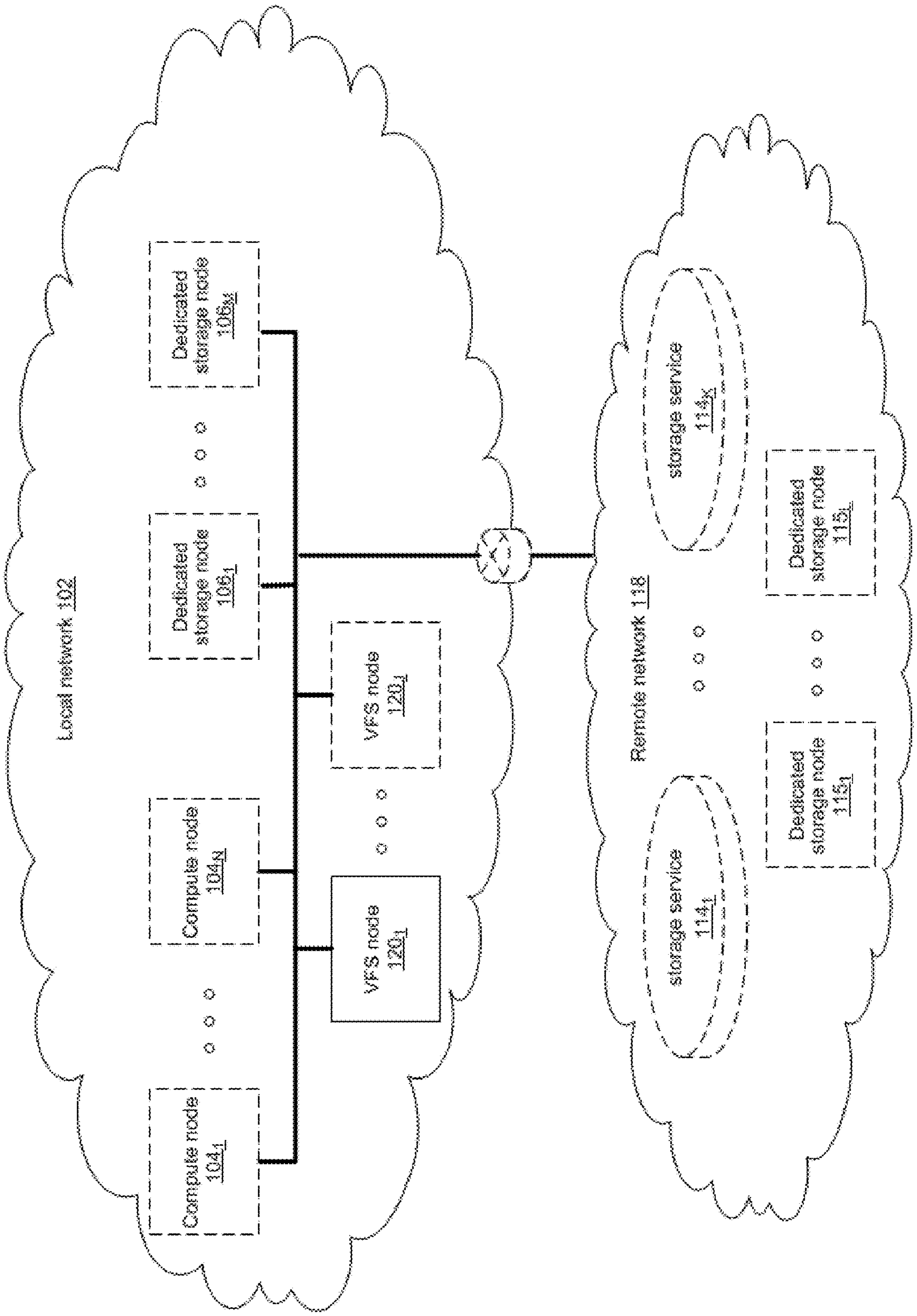
FIG. 1 illustrates various example configurations of a distributed file system in accordance with aspects of this disclosure.

FIG. 1 illustrates various example configurations of a distributed file system in accordance with aspects of this disclosure. Shown in FIG. 1 is a local area network (LAN) 102 comprising one or more nodes 120 (indexed by integers from 1 to J, for j≥1), and optionally comprising (indicated by dashed lines): one or more dedicated storage nodes 106 (indexed by integers from 1 to M, for M≥1), one or more compute nodes 104 (indexed by integers from 1 to N, for N≥1), and/or an edge router that connects the LAN 102 to a remote network 118. The remote network 118 optionally comprises one or more storage services 114 (indexed by integers from 1 to K, for K≥1), and/or one or more dedicated storage nodes 115 (indexed by integers from 1 to L, for L≥1).

Each node 120$_j$ (j an integer, where 1≤j≤J) is a networked computing device (e.g., a server, personal computer, or the like) that comprises circuitry for running processes (e.g., client processes) either directly on an operating system of the device 104$_n$ and/or in one or more virtual machines running in the device 104$_n$.

The compute nodes 104 are networked devices that may run a virtual frontend without a virtual backend. A compute node 104 may run a virtual frontend by taking a single root input/output virtualization (SR-IOV) into the network interface card (NIC) and consuming a complete processor core. Alternatively, the compute node 104 may run the virtual frontend by routing the networking through a Linux kernel networking stack and using kernel process scheduling, thus not having the requirement of a full core. This is useful if a user does not want to allocate a complete core for the file system or if the networking hardware is incompatible with the file system requirements.

Figure 2:
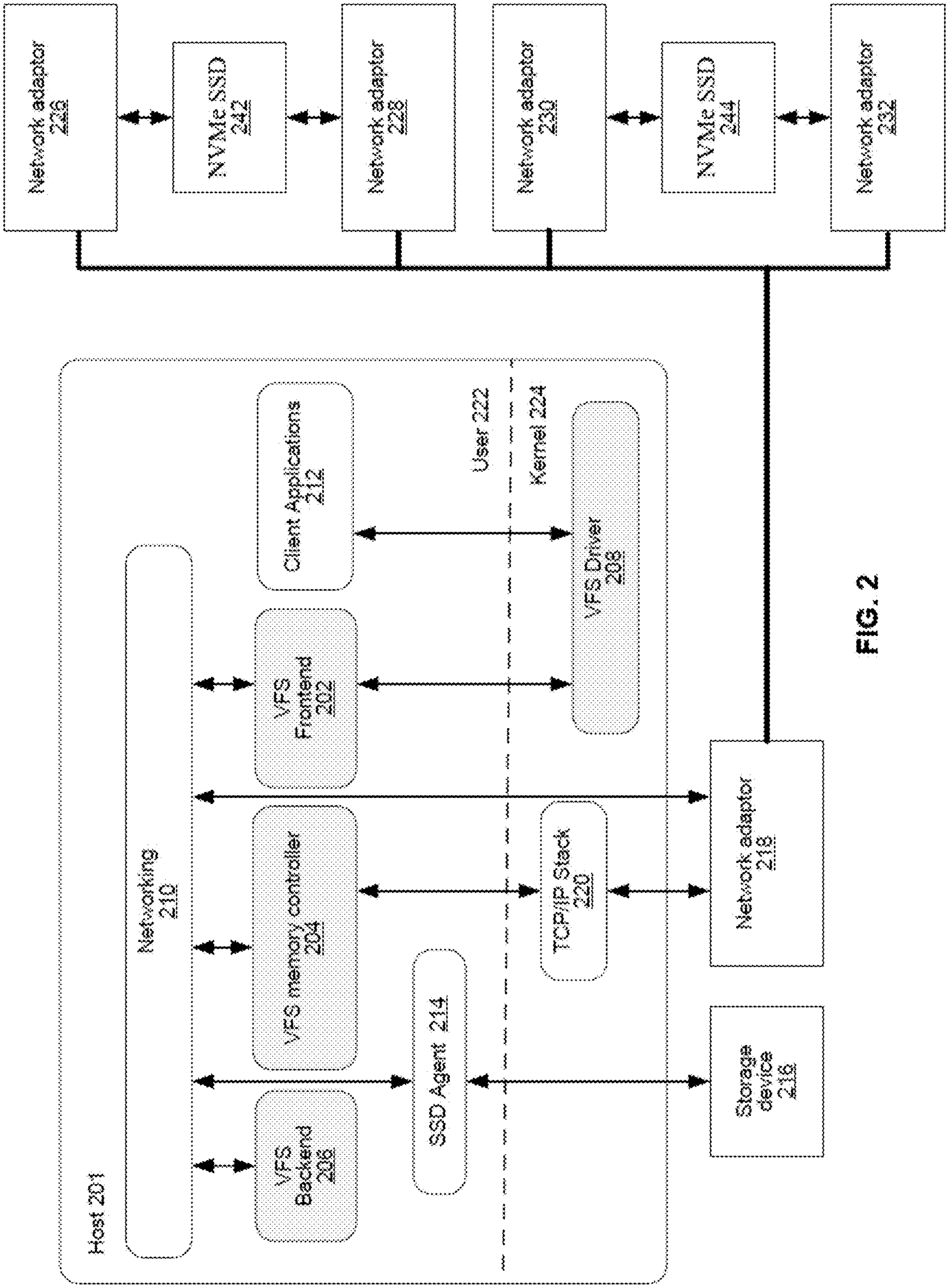
FIG. 2 illustrates an example configuration of a distributed file system node in accordance with aspects of this disclosure.

FIG. 2 illustrates an example configuration of a node in accordance with aspects of this disclosure. A node comprises a frontend 202 and driver 208, a memory controller 204, a backend 206, and an SSD agent 214. The frontend 202 may be a virtual frontend; the memory controller 204 may be a virtual memory controller; the backend 206 may be a virtual backend; and the driver 208 may be a virtual drivers. As used in this disclosure, a virtual file system (VFS) process is a process that implements one or more of: the frontend 202, the memory controller 204, the backend 206, and the SSD agent 214. Thus, in an example implementation, resources (e.g., processing and memory resources) of the node may be shared among client processes and VFS processes. The processes of the VFS may be configured to demand relatively small amounts of the resources to minimize the impact on the performance of the client applications. The frontend 202, the memory controller 204, and/or the backend 206 and/or the SSD agent 214 may run on a processor of the host 201 or on a processor of the network adaptor 218. For a multi-core processor, different VFS process may run on different cores, and may run a different subset of the services. From the perspective of the client process(es) 212, the interface with the virtual file system is independent of the particular physical machine(s) on which the VFS process(es) are running. Client processes only require driver 208 and frontend 202 to be present in order to serve them.

The node may be implemented as a single tenant server (e.g., bare-metal) running directly on an operating system or as a virtual machine (VM) and/or container (e.g., a Linux container (LXC)) within a bare-metal server. The VFS may run within an LXC container as a VM environment. Thus, inside the VM, the only thing that may run is the LXC container comprising the VFS. In a classic bare-metal environment, there are user-space applications and the VFS runs in an LXC container. If the server is running other containerized applications, the VFS may run inside an LXC container that is outside the management scope of the container deployment environment (e.g. Docker).

The node may be serviced by an operating system and/or a virtual machine monitor (VMM) (e.g., a hypervisor). The VMM may be used to create and run the node on a host 201. Multiple cores may reside inside the single LXC container running the VFS, and the VFS may run on a single host 201 using a single Linux kernel. Therefore, a single host 201 may comprise multiple frontends 202, multiple memory controllers 204, multiple backends 206, and/or one or more drivers 208. A driver 208 may run in kernel space outside the scope of the LXC container.

A SR-IOV PCIe virtual function may be used to run the networking stack 210 in user space 222. SR-IOV allows the isolation of PCI Express, such that a single physical PCI Express can be shared on a virtual environment and different virtual functions may be offered to different virtual components on a single physical server machine. The I/O stack 210 enables the VFS node to bypasses the standard TCP/IP stack 220 and communicate directly with the network adapter 218. A Portable Operating System Interface for uniX (POSIX) VFS functionality may be provided through lockless queues to the VFS driver 208. SR-IOV or full PCIe physical function address may also be used to run non-volatile memory express (NVMe) driver 214 in user space 222, thus bypassing the Linux IO stack completely. NVMe may be used to access non-volatile storage device 216 attached via a PCI Express (PCIe) bus. The non-volatile storage device 220 may be, for example, flash memory that comes in the form of a solid-state drive (SSD) or Storage Class Memory (SCM) that may come in the form of an SSD or a memory module (DIMM). Other example may include storage class memory technologies such as 3D-XPoint.

The SSD may be implemented as a networked device by coupling the physical SSD 216 with the SSD agent 214 and networking 210. Alternatively, the SSD may be implemented as a network-attached NVMe SSD 242 or 244 by using a network protocol such as NVMe-oF (NVMe over Fabrics). NVMe-oF may allow access to the NVMe device using redundant network links, thereby providing a higher level or resiliency. Network adapters 226, 228, 230 and 232 may comprise hardware acceleration for connection to the NVMe SSD 242 and 244 to transform them into networked NVMe-OF devices without the use of a server. The NVMe SSDs 242 and 244 may each comprise two physical ports, and all the data may be accessed through either of these ports.

Each client process/application 212 may run directly on an operating system or may run in a virtual machine and/or container serviced by the operating system and/or hypervisor. A client process 212 may read data from storage and/or write data to storage in the course of performing its primary function. The primary function of a client process 212, however, is not storage-related (i.e., the process is only concerned that its data is reliably stored and is retrievable when needed, and not concerned with where, when, or how the data is stored). Example applications which give rise to such processes include: email servers, web servers, office productivity applications, customer relationship management (CRM), animated video rendering, genomics calculation, chip design, software builds, and enterprise resource planning (ERP).

A client application 212 may make a system call to the kernel 224 which communicates with the VFS driver 208. The VFS driver 208 puts a corresponding request on a queue of the VFS frontend 202. If several VFS frontends exist, the driver may load balance accesses to the different frontends, making sure a single file/directory is always accessed via the same frontend. This may be done by sharding the frontend based on the ID of the file or directory. The VFS frontend 202 provides an interface for routing file system requests to an appropriate VFS backend based on the bucket that is responsible for that operation. The appropriate VFS backend may be on the same host or it may be on another host.

A VFS backend 206 hosts several buckets, each one of them services the file system requests that it receives and carries out tasks to otherwise manage the virtual file system (e.g., load balancing, journaling, maintaining metadata, caching, moving of data between tiers, removing stale data, correcting corrupted data, etc.)

A VFS SSD agent 214 handles interactions with a respective storage device 216. This may include, for example, translating addresses, and generating the commands that are issued to the storage device (e.g., on a SATA, SAS, PCIe, or other suitable bus). Thus, the VFS SSD agent 214 operates as an intermediary between a storage device 216 and the VFS backend 206 of the virtual file system. The SSD agent 214 could also communicate with a standard network storage device supporting a standard protocol such as NVMe-oF (NVMe over Fabrics).

Figure 3:
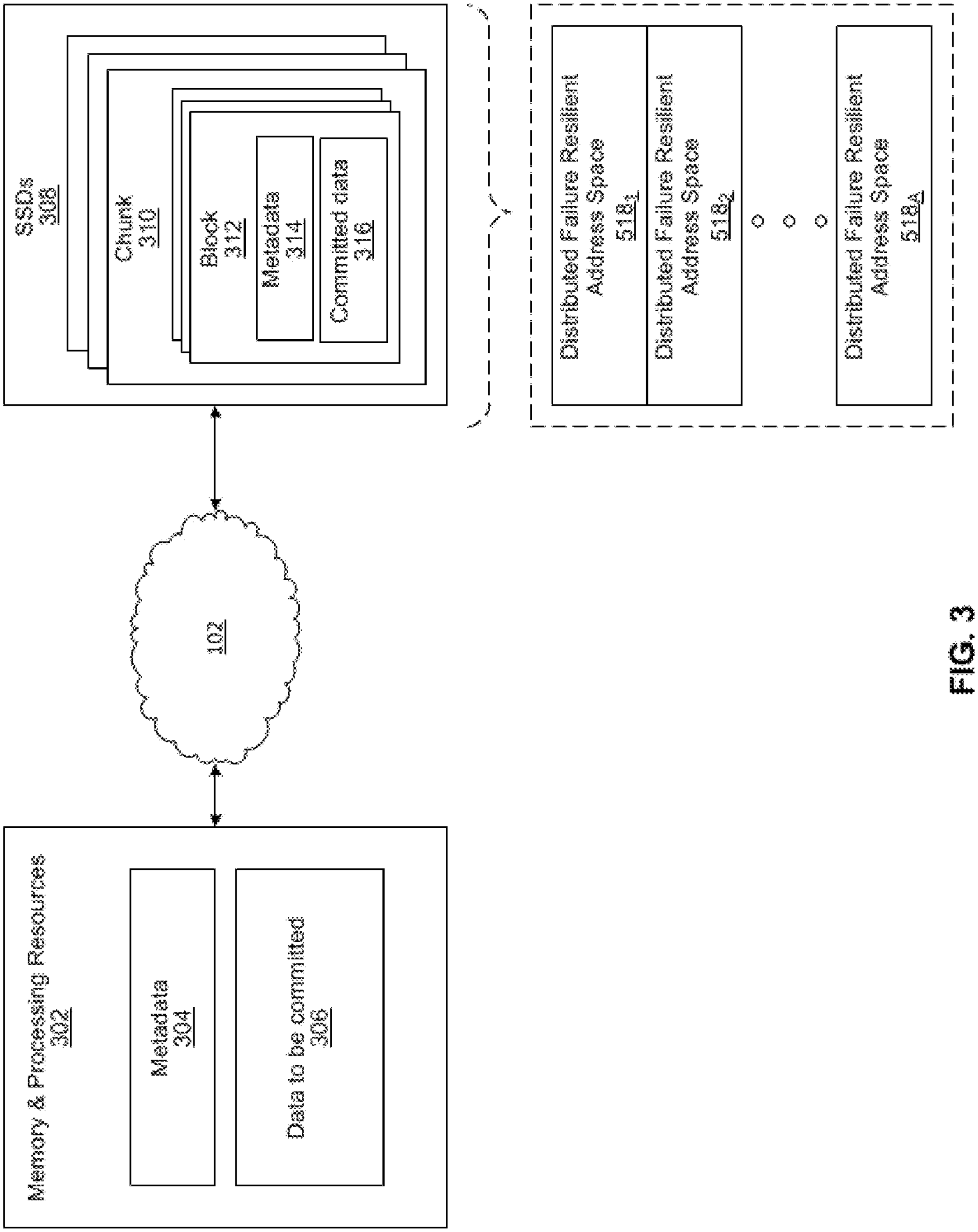
FIG. 3 illustrates another representation of a distributed file system in accordance with an example implementation of this disclosure.

FIG. 3 illustrates another representation of a distributed file system in accordance with an example implementation of this disclosure. In FIG. 3, the element 302 represents memory resources (e.g., DRAM and/or other short-term memory) and processing (e.g., x86 processor(s), ARM processor(s), NICs, ASICs, FPGAs, and/or the like) resources of various node(s) (compute, storage, and/or VFS) on which resides a virtual file system, such as described regarding FIG. 2 above. The element 308 represents the one or more physical storage devices 216 which provide the long term storage of the virtual file system.

As shown in FIG. 3, the physical storage is organized into a plurality of distributed failure resilient address spaces (DFRASs) 318. Each of which comprises a plurality of chunks 310, which in turn comprises a plurality of blocks 312. The organization of blocks 312 into chunks 310 is only a convenience in some implementations and may not be done in all implementations. Each block 312 stores committed data 316 (which may take on various states, discussed below) and/or metadata 314 that describes or references committed data 316.

The organization of the storage 308 into a plurality of DFRASs enables high performance parallel commits from many—perhaps all—of the nodes of the virtual file system (e.g., all nodes $\mathbf{104}_1$-$\mathbf{104}_N$, $\mathbf{106}_1$-$\mathbf{106}_M$, and $\mathbf{120}_1$-$\mathbf{120}_J$ of FIG. 1 may perform concurrent commits in parallel). In an example implementation, each of the nodes of the virtual file system may own a respective one or more of the plurality of DFRAS and have exclusive read/commit access to the DFRASs that it owns.

Each bucket owns a DFRAS, and thus does not need to coordinate with any other node when writing to it. Each bucket may build stripes across many different chunks on many different SSDs, thus each bucket with its DFRAS can choose what "chunk stripe" to write to currently based on many parameters, and there is no coordination required in order to do so once the chunks are allocated to that bucket. All buckets can effectively write to all SSDs without any need to coordinate.

Each DFRAS being owned and accessible by only its owner bucket that runs on a specific node allows each of the nodes of the VFS to control a portion of the storage 308 without having to coordinate with any other nodes (except during [re]assignment of the buckets holding the DFRASs during initialization or after a node failure, for example, which may be performed asynchronously to actual reads/commits to storage 308). Thus, in such an implementation, each node may read/commit to its buckets' DFRASs independently of what the other nodes are doing, with no requirement to reach any consensus when reading and committing to storage 308. Furthermore, in the event of a failure of a particular node, the fact the particular node owns a plurality of buckets permits more intelligent and efficient redistribution of its workload to other nodes (rather the whole workload having to be assigned to a single node, which may create a "hot spot"). In this regard, in some implementations the number of buckets may be large relative to the number of nodes in the system such that any one bucket may be a relatively small load to place on another node. This permits fine grained redistribution of the load of a failed node according to the capabilities and capacity of the other nodes (e.g., nodes with more capabilities and capacity may be given a higher percentage of the failed nodes buckets).

To permit such operation, metadata may be maintained that maps each bucket to its current owning node such that reads and commits to storage 308 can be redirected to the appropriate node.

Load distribution is possible because the entire file system metadata space (e.g., directory, file attributes, content range in the file, etc.) can be broken (e.g., chopped or sharded) into small, uniform pieces (e.g., "shards"). For example, a large system with 30 k servers could chop the metadata space into 128 k or 256 k shards.

Each such metadata shard may be maintained in a "bucket." Each VFS node may have responsibility over several buckets. When a bucket is serving metadata shards on a given backend, the bucket is considered "active" or the "leader" of that bucket. Typically, there are many more buckets than VFS nodes. For example, a small system with 6 nodes could have 120 buckets, and a larger system with 1,000 nodes could have 8 k buckets.

Each bucket may be active on a small set of nodes, typically 5 nodes that that form a penta-group for that bucket. The cluster configuration keeps all participating nodes up-to-date regarding the penta-group assignment for each bucket.

Each penta-group monitors itself. For example, if the cluster has 10 k servers, and each server has 6 buckets, each server will only need to talk with 30 different servers to maintain the status of its buckets (6 buckets will have 6 penta-groups, so 6*5=30). This is a much smaller number than if a centralized entity had to monitor all nodes and keep a cluster-wide state. The use of penta-groups allows performance to scale with bigger clusters, as nodes do not perform more work when the cluster size increases. This could pose a disadvantage that in a "dumb" mode a small cluster could actually generate more communication than there are physical nodes, but this disadvantage is overcome by sending just a single heartbeat between two servers with all the buckets they share (as the cluster grows this will change to just one bucket, but if you have a small 5 server cluster then it will just include all the buckets in all messages and each server will just talk with the other 4). The penta-groups may decide (i.e., reach consensus) using an algorithm that resembles the Raft consensus algorithm.

Each bucket may have a group of compute nodes that can run it. For example, five VFS nodes can run one bucket. However, only one of the nodes in the group is the controller/leader at any given moment. Further, no two buckets share the same group, for large enough clusters. If there are only 5 or 6 nodes in the cluster, most buckets may share backends. In a reasonably large cluster there many distinct node groups. For example, with 26 nodes, there are more than 64,000 (26!/5!*(26-5)!) possible five-node groups (i.e., penta-groups).

All nodes in a group know and agree (i.e., reach consensus) on which node is the actual active controller (i.e., leader) of that bucket. A node accessing the bucket may remember ("cache") the last node that was the leader for that bucket out of the (e.g., five) members of a group. If it accesses the bucket leader, the bucket leader performs the requested operation. If it accesses a node that is not the current leader, that node indicates the leader to "redirect" the access. If there is a timeout accessing the cached leader node, the contacting node may try a different node of the same penta-group. All the nodes in the cluster share common "configuration" of the cluster, which allows the nodes to know which server may run each bucket.

Each bucket may have a load/usage value that indicates how heavily the bucket is being used by applications running on the file system. For example, a server node with 11 lightly used buckets may receive another bucket of metadata to run before a server with 9 heavily used buckets, even though there will be an imbalance in the number of buckets used. Load value may be determined according to average response latencies, number of concurrently run operations, memory consumed or other metrics.

Redistribution may also occur even when a VFS node does not fail. If the system identifies that one node is busier than the others based on the tracked load metrics, the system can move (i.e., "fail over") one of its buckets to another server that is less busy. However, before actually relocating a bucket to a different host, load balancing may be achieved by diverting writes and reads. Since each write may end up on a different group of nodes, decided by the DFRAS, a node with a higher load may not be selected to be in a stripe to which data is being written. The system may also opt to not serve reads from a highly loaded node. For example, a "degraded mode read" may be performed, wherein a block in the highly loaded node is reconstructed from the other blocks of the same stripe. A degraded mode read is a read that is performed via the rest of the nodes in the same stripe, and the data is reconstructed via the failure protection. A degraded mode read may be performed when the read latency is too high, as the initiator of the read may assume that that node is down. If the load is high enough to create higher read latencies, the cluster may revert to reading that data from the other nodes and reconstructing the needed data using the degraded mode read.

Each bucket manages its own distributed erasure coding instance (i.e., DFRAS 518) and does not need to cooperate with other buckets to perform read or write operations. There are potentially thousands of concurrent, distributed erasure coding instances working concurrently, each for the different bucket. This is an integral part of scaling performance, as it effectively allows any large file system to be divided into independent pieces that do not need to be coordinated, thus providing high performance regardless of the scale.

Each bucket handles all the file systems operations that fall into its shard. For example, the directory structure, file attributes and file data ranges will fall into a particular bucket's jurisdiction.

An operation done from any frontend starts by finding out what bucket owns that operation. Then the backend leader, and the node, for that bucket is determined. This determination may be performed by trying the last-known leader. If the last-known leader is not the current leader, that node may know which node is the current leader. If the last-known leader is not part of the bucket's penta-group anymore, that backend will let the front end know that it should go back to the configuration to find a member of the bucket's penta-group. The distribution of operations allows complex operations to be handled by a plurality of servers, rather than by a single computer in a standard system.

If the cluster of size is small (e.g., 5) and penta-groups are used, there will be buckets that share the same group. As the cluster size grows, buckets are redistributed such that no two groups are identical.

Figure 4:
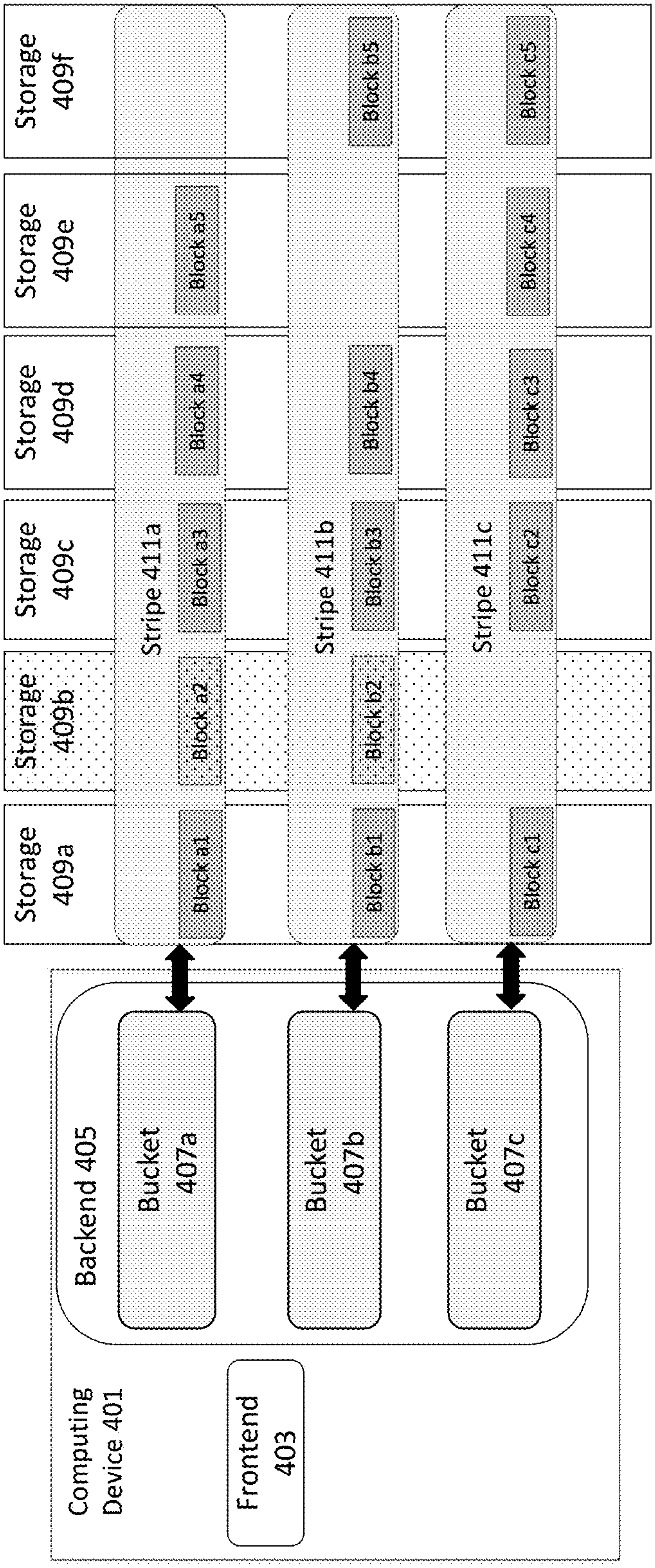
FIG. 4 illustrates an example of a distributed file system in accordance with an example implementation of this disclosure.

FIG. 4 illustrates an example of a distributed file system in accordance with an example implementation of this disclosure. The distributed file system comprises a computing device 401 and a plurality of storage devices 409*a*, 409*b*, 409*c*, 409*d*, 409*e* and 409*f* that may reside on one or more network interface cards (NICs). A distributed file system may also comprise a plurality of computing devices.

Computing device 401 comprises a frontend 403 and a backend 405. The backend 405 comprises three buckets 407*a*, 407*b* and 407*c*. Each bucket 407*a*, 407*b* and 407*c* in the backend 405 is operable to build one or more failure resilient stripes comprising a plurality of blocks. Computing devices 401 and storage devices 409*a-f* may be operably coupled via one or more NICs. In the example of FIG. 4, bucket 407*a* owns stripe 411*a*, bucket 407*b* owns stripe 411*b*, and bucket 407*c* owns stripe 411*c*.

Stripe 411*a* comprises block a1 in storage device 409*a*, block a2 in storage device 409*b*, block a3 in storage device 409*c*, block a4 in storage device 409*d*, and block a5 in storage device 409*e*. Stripe 411*b* comprises block b1 in storage device 409*a*, block b2 in storage device 409*b*, block b3 in storage device 409*c*, block b4 in storage device 409*d*, and block b5 in storage device 409*f*. Stripe 411*c* comprises block c1 in storage device 409*a*, block c2 in storage device 409*c*, block c3 in storage device 409*d*, block c4 in storage device 409*e*, and block c5 in storage device 409*f*.

In general, each storage block of the plurality of storage blocks in a particular failure-resilient (or failure-protected) stripe may be located in a different storage device of the plurality of storage devices. Alternatively, the plurality of storage blocks of a failure-resilient stripe may be distributed across at least two storage devices of the plurality of storage devices.

For illustration, the distributed file system of FIG. 4 comprises one computing device 401, a backend 405 with three buckets 407*a-c*, six storage devices 409*a-f*, and stripes 411*a-c* with five blocks each. A different number of computing devices (e.g., CPU based servers), buckets per backend, storage devices (e.g., SSDs), and blocks per stripe may be used without deviating from this disclosure. For example, with 10 blocks per stripe, 8 blocks of data could be protected with 2 blocks of error protection/correction (i.e., using an 8+2 stripe). Likewise, with 10 failure domains (and 10 blocks per stripe), 6 blocks of data could be protected with 4 blocks of error protection/correction (i.e., using a 6+4 stripe).

During a degraded read, in which data on one or more storage devices is unavailable, the error protection/correction data blocks are used in combination with available data blocks to regenerate the unavailable data.

A distributed awareness of garbage collection events and general health of the SSDs may be used to reduce peak access time. SSDs may run a background garbage collection and re-arrangement process during which times portions of the SSD capacity are not available (e.g., for several milliseconds). Also, when some forms of mixed operations are being run, the performance of other operations, especially in regards to latency) degrade. Standard SSDs may run garbage collection at their own time as a block box implementation detail, uncorrelated with other SSDs that may reside on the same server or on the same network. Also, SSDs may run several small garbage collection operations, scattered throughout different locations of the SSDs, in what may appear to an application as a random manner.

This disclosure explains how a distributed system can leverage the ability to control garbage collection execution time to ensure consistently low latency times to user application. Also, health monitoring of the devices may be used to steer read and write accesses to healthy performing devices.

A host computing device 401 can control when an SSD 409 is going to have a garbage collection event. Prior to the garbage collection, the system may trim a portion of the SSD. Trimming (or deallocating) is the process of identifying that space on the SSD is no longer needed, and that space can be reused or recycled. During garbage collection, the system will not direct writes to that SSD and will perform degraded mode reads from the other SSDs.

The SSDs may provide an API that comprises: 1) the trim/deallocate command that indicate what SSD region is no longer needed; 2) a query to find out whether a garbage collection is needed according to how much available write capacity still exists on the SSD; 3) command to start the garbage collection process; and 4) a query to tell whether the garbage collection process is still running (e.g., percent finished).

The system may manage what SSDs are going to run garbage collection and not send read or write access requests (i.e., IOs) to these SSDs. Instead, the system will steer writes to other SSDs, and the system will perform degraded mode reads from other SSDs in the system.

Reads and writes may also be distributed according to the health of an SSD. The system can monitor an SSD health by tracking of how long IOs take. For example, if IOs usually take 30-200 microseconds, measurements that are higher than these levels may indicate that the SSD device is stressed (e.g., over-utilized). To reduce stress, the system may begin by redirecting writes. If the SSD health continues to indicate over-utilization, instead of performing reads from these devices, the system can perform degraded-mode reads from other SSDs. The file system may further deallocate capacity from the stressed SSD and also run garbage collection earlier than planned.

In FIG. 4, for example, if storage device 409*b* has limited availability due to garbage collection of over-utilization, read and write access requests to storage device 409*b* may be redirected to the other storage devices 409*a*, 409*c*, 409*d*, 409*e* and 409*f*. If a user requests to write to stripe 411*a* (comprising block a2 is storage device 409*b*), that write request may be redirected to stripe 411*c* which does not comprise any blocks in storage device 409*b*. If a user requests to read block a2 is storage device 409*b*, that read request may be serviced by a degraded mode read which utilizes blocks a1, a3, a4 and a5 to regenerate block a2.

Figure 5:
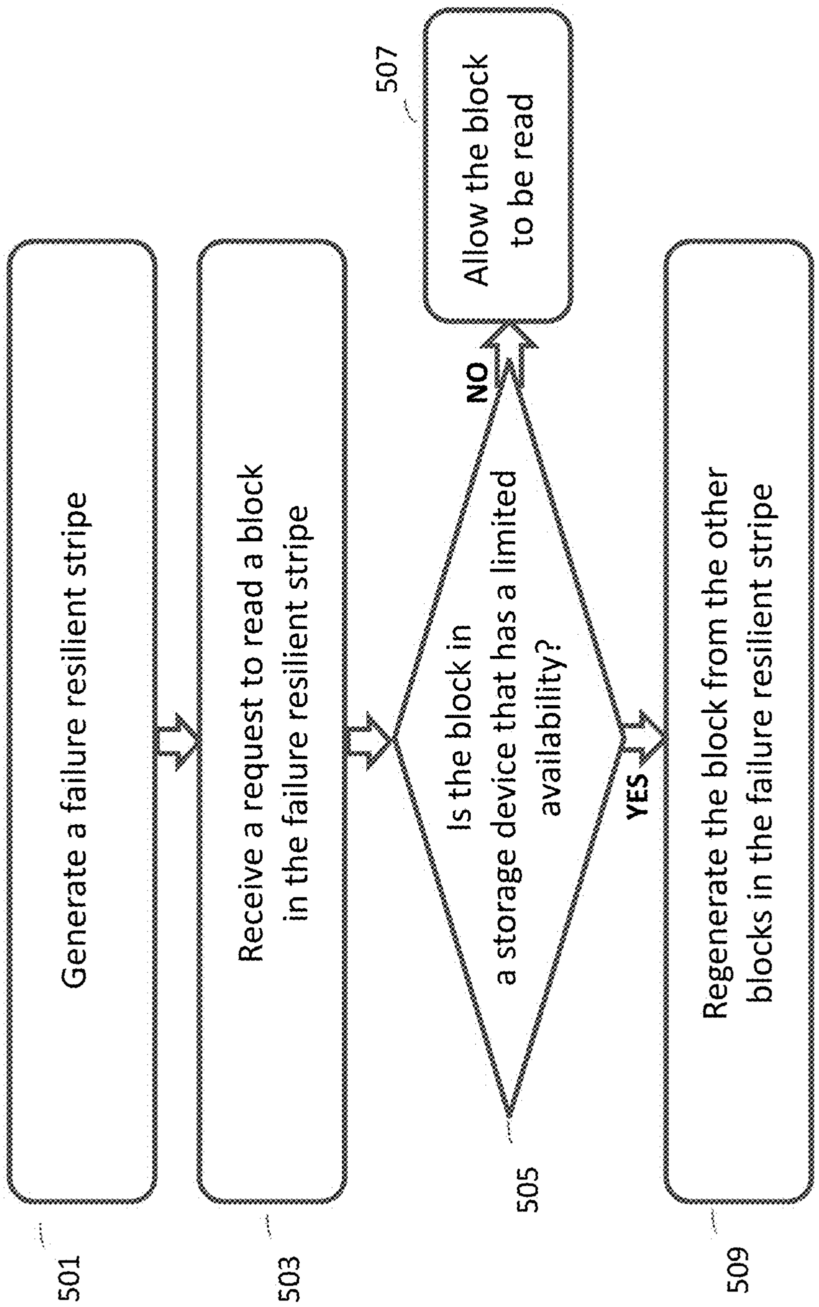
FIG. 5 is a flowchart illustrating an example method for reading from a distributed file system in accordance with this disclosure.

FIG. 5 is a flowchart illustrating an example method for reading from a distributed file system in accordance with this disclosure. This method may be performed on a network interface card for example. In block 501, a failure resilient stripe is generated. In block 503, a request to read from a block in the failure resilient stripe is received.

In block 505, the availability of the storage device comprising the block in the failure resilient stripe is determined. The availability (and accessibility) of a storage device may be limited, for example, during a garbage collection process. Unused blocks in a storage device may be deallocated before garbage collection begins to shorten the time spent during garbage collection. Input/output access to a storage device may also take longer if too many applications are accessing the storage device at once. Accordingly, availability may be determined according to the access times for the storage device. For example, an increase in access times may indicate a stressed storage device. The level of availability may be a relative parameter. When the access to one storage device takes longer than the access to another storage device, load may be redistributed from the more stressed storage device. A storage device may also be determined to be unavailable if its access time increases above a threshold. Such a threshold may be user-determined and/or based on an average access time when the storage device is otherwise idle.

If the storage device is available, the read request is allowed in block 507. If, however, the availability of the storage devices with the block is limited, a degraded read is performed in block 609, and the data in the block is regenerate from the other blocks in the failure resilient stripe.

Figure 6:
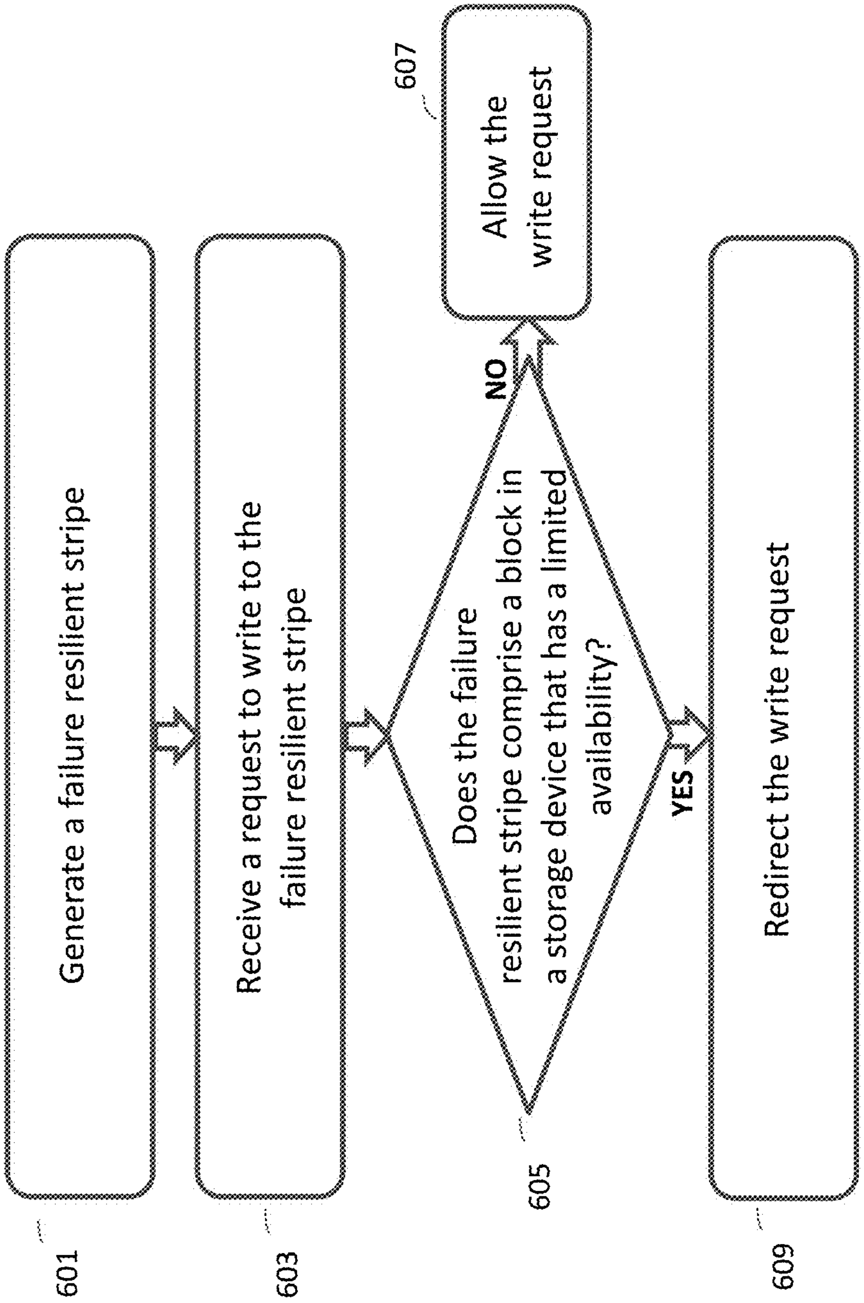
FIG. 6 is a flowchart illustrating an example method for writing to a distributed file system in accordance with this disclosure.

FIG. 6 is a flowchart illustrating an example method for writing to a distributed file system in accordance with this disclosure. In block 601, a failure resilient stripe is generated. In block 603, a request to write to the failure resilient stripe is received.

In block 605, the availability of the storage devices with blocks in the failure resilient stripe is determined. If the availability of the storage devices with blocks in the failure resilient stripe is not limited, the write request is allowed in block 607. If, however, the availability of one or more storage devices with blocks in the failure resilient stripe is limited, the write request is redirected in block 609.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system comprising:
- a processor operable to maintain a plurality of stripes, wherein:
  - each stripe of the plurality of stripes spans a different set of storage devices of a plurality of storage devices, wherein:
    - each stripe of the plurality of stripes is a failure-resilient stripe generated by a backend of a computing device comprising one or more buckets,
  - each bucket is operable to generate a respective failure-resilient stripe as a plurality of blocks distributed across at least two storage devices of the plurality of storage devices,
    - at least one block of the plurality of blocks in each failure-resilient stripe comprises error correction data, and
    - in response to determining that a garbage collection process is actively running on a storage device storing a block of a stripe, a read access directed to the block is redirected, prior to issuing the read access to the storage device, and the block is reconstructed from other blocks of the stripe without accessing the storage device.

2. The system of claim 1, wherein while the garbage collection is running on a storage device, a write access to the storage device is redirected to a stripe comprising exclusively of blocks in storage devices other the storage device.

3. The system of claim 1, wherein while the garbage collection is running on a storage device, a read access to the block is redirected to other blocks of the stripe.

4. The system of claim 3, wherein the stripe is a failure resilient stripe.

5. The system of claim 1, wherein the system comprises:
a computing device, wherein:
each bucket of one or more buckets, on the computing device, is operable to generate a failure resilient stripe comprising a plurality of blocks distributed across at least two storage devices of the plurality of storage devices, and
at least one block of the plurality of blocks in each failure resilient stripe comprises error correction data.

6. The system of claim 5, wherein the computing device is a host of a storage device of the plurality of storage devices, and wherein the host computing device is operable deallocate unused blocks of the hosted storage device prior to the garbage collection process.

7. The system of claim 6, wherein the host computing device is operable redirect an attempted access to the hosted storage device when the garbage collection process is run.

8. The system of claim 5, wherein the computing device is on a network interface card.

9. A system comprising:
a processor operable to maintain a plurality of failure-resilient stripes, wherein:
each failure-resilient stripe is generated by a backend of a computing device comprising one or more buckets,
each bucket is operable to generate a respective failure-resilient stripe as a plurality of blocks distributed across at least two storage devices of a plurality of storage devices,
at least one block of the plurality of blocks in each failure-resilient stripe comprises error correction data,
each stripe of the plurality of stripes spans a different set of storage devices of the plurality of storage devices,
access times for each storage device of the plurality of storage devices are tracked during operation, and
in response to determining that an access time for a particular storage device exceeds a threshold indicative of temporary internal activity of the storage device, a read access directed to the particular storage device is redirected, prior to issuing the read access to the particular storage device, and a block, of the particular storage device, is reconstructed from other blocks in a stripe comprising the block.

10. The system of claim 9, wherein a write access to the particular storage device is redirected to a stripe comprising exclusively of blocks in storage devices of the plurality of storage devices other that the particular storage device.

11. The system of claim 9, wherein a read access directed to a block in the particular storage device is redirected to one or more other blocks of the stripe that comprises the block in the particular storage device, and wherein the one or more other blocks of the stripe are in storage devices of the plurality of storage devices other that the particular storage device.

12. The system of claim 11, wherein the block in the particular device is regenerated using the one or more other blocks of the stripe.

13. The system of claim 9, wherein the system comprises:
a computing device comprising a backend with one or more buckets, wherein:
each bucket of the one or more buckets is operable to generate a failure resilient stripe comprising a plurality of blocks distributed across at least two storage devices of the plurality of storage devices, and
at least one block of the plurality of blocks in each failure resilient stripe comprises error correction data.

14. The system of claim 13, wherein the computing device is a host of the particular storage device, and wherein the host computing device is operable deallocate unused blocks of the particular storage device.

15. The system of claim 13, wherein the computing device of the plurality of computing devices is a host of the particular storage device, and wherein the host computing device is operable to run a garbage collection process on the particular storage device.

16. The system of claim 13, wherein the computing device is on a network interface card.

17. A method comprising:
maintaining, via a backend of a computing device comprising one or more buckets, a plurality of failure-resilient stripes via a plurality of storage devices, wherein:
each failure-resilient stripe is generated as a plurality of blocks distributed across at least two storage devices of the plurality of storage devices,
at least one block of the plurality of blocks in each failure-resilient stripe comprises error correction data, and
each stripe of the plurality of failure-resilient stripes spans a different set of storage devices of the plurality of storage devices;
receiving a request, at a computing device, to access a first storage device;
determining that a garbage collection process is actively running on the first storage device;
redirecting the access request, prior to issuing the access request to the first storage device, to a second storage device; and
reconstructing a first block of the first storage device from one or more other blocks of a failure-resilient stripe without accessing the first storage device.

18. The method of claim 17, wherein the method comprises running a garbage collection process on the first storage device, and wherein at least a portion of the first storage device is not available during the garbage collection process.

19. The method of claim 17, wherein the access request is a read access directed to a first block in the first storage device, and wherein the method comprises regenerating the first block using one or more blocks of a failure resilient stripe other than the first block.

20. The method of claim 17, wherein the method comprises deallocating unused blocks of the first storage device.

21. The method of claim 17, wherein the method comprises generating a failure resilient stripe across at least the first storage device and the second storage device, wherein the failure resilient stripe comprises at least one block of error correction data.

22. The method of claim 17, wherein the method comprises tracking access times for the first storage device.

23. The method of claim 17, wherein the method comprises determining that the first storage device is unavailable if the access times for the first storage device increase above a threshold.

* * * * *